INVENTOR
ROBERT W. BURBY
BY John R. Faulkner
E. Dennis O'Connor
ATTORNEYS

United States Patent Office 3,469,166
Patented Sept. 23, 1969

3,469,166
DIRECT CURRENT MOTOR SPEED CONTROL
Robert W. Burby, Ann Arbor, Mich., assignor to Ford Motor Company, Dearborn, Mich., a corporation of Delaware
Filed Oct. 31, 1966, Ser. No. 590,774
Int. Cl. H02p 5/44, 7/50
U.S. Cl. 318—361       7 Claims

ABSTRACT OF THE DISCLOSURE

A control circuit for a direct current motor having a low speed brush and a high speed brush angularly spaced from the low speed brush. Current may be directed to either brush as desired motor speed dictates. During high speed motor operation, current automatically will be terminated to the high speed brush and shifted to the low speed brush upon a predetermined load being applied to the motor in order to increase motor load bearing capabilities.

---

This invention relates to a variable speed control device for a permanent magnet direct current motor, and in particular to a speed control device whereby higher motor speeds may be achieved with only a small sacrifice of motor load carrying characteristics.

Permanent magnet direct current motors are well-known in the art and have wide applicability due to their simplicity of design and relatively low cost. For example, such motors are particularly useful to provide the driving power for motor vehicle windshield wipers. However, a disadvantage attendant the use of such motors is an impairment of load carrying capabilities during high speed motor operation.

It is, therefore, an object of this invention to provide a speed control device for a permanent magnet direct current motor whereby the motor may be driven at varying high speeds with only a small sacrifice of motor load carrying capability relative to low speed operation.

A variable speed control device for a permanent magnet direct current motor having a high speed brush and a low speed brush and constructed in accordance with this invention includes a direct current source. Two position switch means are provided for applying electrical energy from said source to said low speed brush when said switch means are in a first position and to said low speed brush and said high speed brush when said means are in a second position. Asymmetrical conducting means are electrically connected in series circuit with said low speed brush and prevent current flow from said low speed brush to said high speed brush when said switch means are in the second position.

Further objects and advantages of this invention will become apparent when the following description is considered in conjunction with the accompanying drawings wherein.

Figure 1:
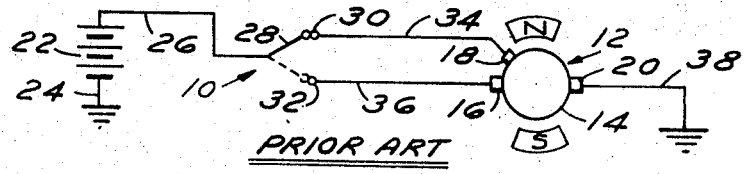
FIGURE 1 illustrates a permanent magnet direct current motor having a conventional control device for two speed motor operation.
Figure 2:
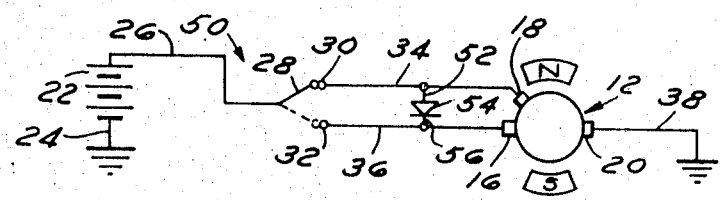
FIGURE 2 illustrates a permanent magnet direct current motor having a variable speed control circuit constructed in accordance with this invention.
Figure 3:
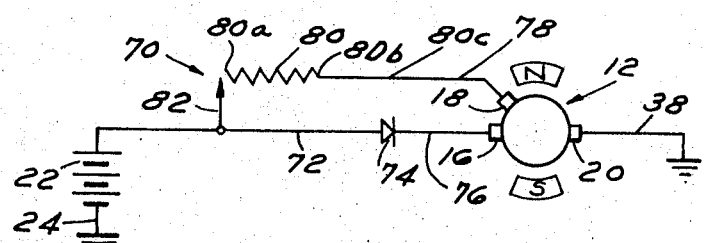
Figure 4:
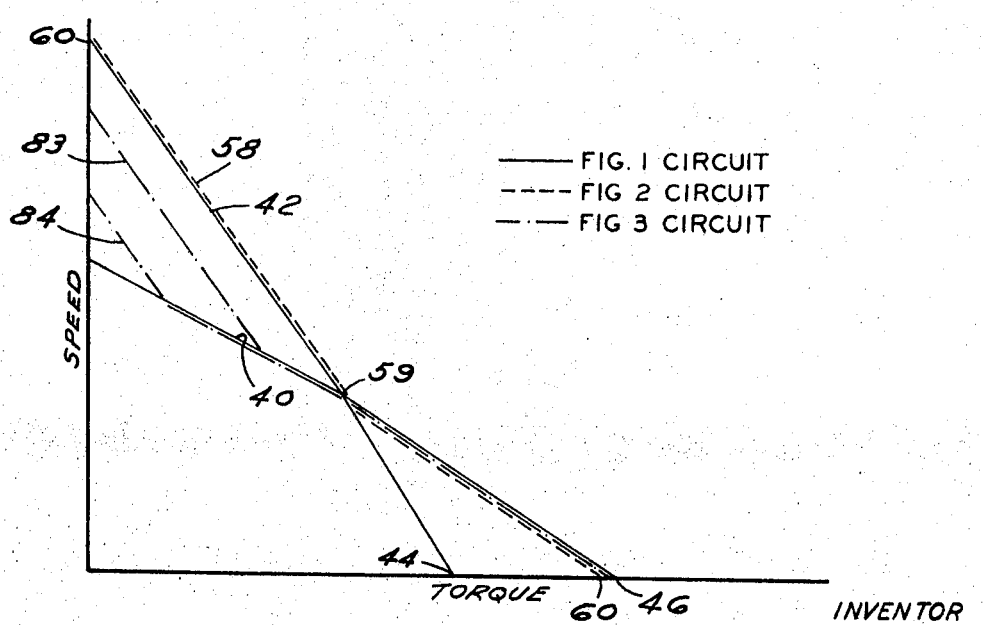

FIGURE 3 denotes a permanent magnet direct current motor having a variable speed control device constructed in accordance with a second embodiment of this invention; and FIGURE 4 is a graph having an ordinate of motor speed and an abscissa of torque and showing curves for the circuitry illustrated in FIGURES 1-3.

Referring now in detail to the drawings and in particular to FIGURE 1, the numeral 10 designates a conventional two speed control circuit for a three brush permanent magnet motor 12 having a low speed brush 16, a high speed brush 18 and a ground brush 20 electrically connected to armature 14. Three brush permanent magnet motors such as motor 12 are well-known in the art and no need is seen to detail herein the construction of such a motor. Generally, it may be said that when electrical energy is applied to high speed brush 18, fewer armature windings are effective to produce a voltage drop across motor 12 than when electrical energy is applied to low speed brush 16.

A suitable direct current source 22 has one terminal thereof connected to ground by conductor 24 and the other terminal connected to a two position switch arm 28 that is movable between contacts 30 and 32. A conductor 34 connects contact 30 with brush 18 and a conductor 36 connects contact 32 with brush 16. A conductor 38 connects brush 20 with ground.

The speed-torque curve for motor 12 when source 22 is connected in circuit to brush 16 is designated by the numeral 40 in FIGURE 4. A similar curve 42 is shown for motor operation when source 22 is connected in circuit to brush 18. It may be seen from FIGURE 4 that when motor 12 is operated at high speed, a significant sacrifice is made of the load carrying capabilities of the motor as the stall torque 44 of curve 42 is only a percentage of the stall torque 46 of curve 40.

FIGURE 2 illustrates a first embodiment 50 of speed control circuit constructed in accordance with this invention. In this circuit, a conductive path is provided between conductors 34 and 36 and comprises conductor 52, diode 54 and conductor 56. When switch arm 28 contacts contact 32 the source 22 is in circuit with low speed brush 16 just as in the circuit of FIGURE 1. Speed-torque curve 40 thus illustrates the operation of motor 12 under such conditions. However, upon contact being made between switch arm 28 and contact 30, operation of motor 12 is represented by speed-torque curve 58. Curve 58 is identical to curve 42 until this curve intersects curve 40 at point 59. The operation of motor 12 then approximates low speed operation (curve 40), so that stall torque 60 is only slightly less than stall torque 46.

Tests of the circuit illustrated in FIGURE 2 and constructed from the following components have proven satisfactory. Battery 12 was the 12 volt automotive type. Diode 56 was rated at 18 amperes with a proper heat sink. Motor 12 had an armature length of 1.2 inches and utilized 10 coils of 37 turns per coil of number 21½ wire. Brushes 16 and 20 were 180 degrees apart with brush 18 offset 65 degrees from brush 16. The permanent magnets used were of the curved segment type extending through an arc of 145 degrees with an axial length of 1.75 inches and a thickness of 0.25 inch. The magnets were formed from a compound available commercially as "Indox IV." All conductive leads used were number 16 stranded copper wire.

The embodiment of the invention illustrated in FIGURE 3 comprises the control circuit 70 that allows an infinite number of speed settings for motor 12 between the high and low speed conditions. Circuit 70 includes a conductor 72 connecting source 22 and a diode 74 which is in turn connected to low speed brush 16 by a conductor 76. A slide arm 82 is arranged to slide along conductor 72 so as to be out of contact, or contact at a plurality of positions a resistance 80 so as to form a variable resistor.

When slide arm 82 is out of contact with resistance 80, current flows along conductor 72 from source 22, through diode 74 to brush 16 for normal low speed operation of motor 12 (curve 40 of FIGURE 4). However, the moment slide arm 82 is brought into contact with resistance 80 at point 80a, it has been observed that the entire input current flows to high speed brush 18. Motor operation under this condition is represented by curve 84 that is substantially parallel to curve 60 until curve 84 intersects curve 40 at which time it proceeds substantially identically to curve 40.

When slide 82 is moved to point 80b, normal high speed operation of motor 12 occurs as represented by curve 58. An infinite number of settings are possible between points 80a and 80b. Operation of motor 12 at one of these settings is represented by curve 83.

Satisfactory tests of the circuit illustrated by FIGURE 3 have been conducted when the elements of this circuit are identical to the corresponding elements used to construct the circuit of FIGURE 2 for the tests of the FIGURE 2 circuit detailed above. Resistance 80 was a 12.5-watt, 3-ohm resistance made infinitely variable between 0 and 3 ohms due to the use of slide 82.

It may thus be seen that this invention provides a speed control device for a permanent magnet direct current motor that allows a variety of motor speeds to be attained without a substantial sacrifice in the load bearing characteristics of the motor relative to a low speed arrangement.

I claim:

1. An operating control device for a direct current motor having a high speed brush and a low speed brush, said device comprising a direct current source, first electrically conductive means interconnecting said current source and said high speed brush, and second electrically conductive means interconnecting said first electrically conductive means and said low speed brush, said second electrically conductive means including asymmetrical conducting means preventing current flow from said low speed brush to said first electrically conductive means.

2. The device of claim 1, wherein said asymmetrical conducting means comprise a diode.

3. An operating control device for a direct current motor having a high speed brush and a low speed brush, said device comprising a direct current source, electrically conductive first means connected to said current source and terminating remote from said current source at a circuit junction point, electrically conductive second means interconnecting said junction point and said high speed brush, and electrically conductive third means interconnecting said junction and said high speed brush, said third means including asymmetrical conducting means preventing current flow from said low speed brush to said junction.

4. The device of claim 3, wherein said asymmetrical conducting comprises a diode.

5. A variable speed control device for a direct current motor having a high speed brush and a low speed brush, said device comprising a direct current source, a two position switch electrically connected to said source, first conductive means electrically connecting said switch to said low speed brush when said switch is in the first position, second conductive means electrically connecting said switch to said high speed brush when said switch is in the second position, and third conductive means between said first and second conductive means, said third conductive means including rectifying means preventing the flow of current along said third means from said first conductive means to said second conductive means.

6. The device of claim 5, wherein said rectifying means comprises a diode that allows current flow along said third conductive means from said second conductive means to said first conductive means.

7. A variable speed control device for a direct current motor having a high speed brush, a low speed brush and a brush connected to ground, said device comprising a direct current source, a first conductor electrically connected to said low speed brush, a second conductor electrically connected to said high speed brush, a two position switch electrically connecting said current source in series to said first conductor in its first position and electrically connecting said current source in series to said second conductor in its second position, circuit means electrically connecting said first and second conductors, said circuit means including rectifying means preventing current flow from said first conductor to said second conductor.

References Cited
UNITED STATES PATENTS
3,310,722    3/1967    Diello _____ 318—361
FOREIGN PATENTS
1,093,430    11/1954    France.

ORIS L. RADER, Primary Examiner

ROBERT J. HICKEY, Assistant Examiner

U.S. Cl. X.R.

310—219